US010787195B2

United States Patent
Asakura et al.

(10) Patent No.: US 10,787,195 B2
(45) Date of Patent: Sep. 29, 2020

(54) ELECTRIC POWER STEERING SYSTEM (71) Applicant: JTEKT CORPORATION, Osaka-shi, Osaka (JP)

(72) Inventors: Toshihiro Asakura, Chiryu (JP); Hirotsugu Kusano, Kashihara (JP); Hirokazu Tojo, Kashiba (JP)

(73) Assignee: JTEKT CORPORATION, Osaka-shi (JP)

( * ) Notice: Subject to any disclaimer, the term of this patent is extended or adjusted under 35 U.S.C. 154(b) by 142 days.

(21) Appl. No.: 14/279,737

(22) Filed: May 16, 2014

(65) Prior Publication Data
US 2014/0345966 A1   Nov. 27, 2014

(30) Foreign Application Priority Data

May 22, 2013   (JP) ................. 2013-108373
May 22, 2013   (JP) ................. 2013-108374
May 22, 2013   (JP) ................. 2013-108375

(51) Int. Cl.
*B62D 5/04*    (2006.01)
*F16C 19/18*   (2006.01)
(Continued)

(52) U.S. Cl.
CPC ......... *B62D 5/0445* (2013.01); *B62D 5/0448* (2013.01); *F16C 23/08* (2013.01);
(Continued)

(58) Field of Classification Search
CPC ..... B62D 5/0445; B62D 5/0448; F16C 19/18; F16C 23/08; F16C 25/08; F16C 25/083;
(Continued)

(56) References Cited

U.S. PATENT DOCUMENTS 3,003,836 A * 10/1961 Hill ................. B21B 31/074
                                                    384/455
3,292,980 A * 12/1966 Gustafsson ............ F16C 19/06
                                                    384/516
(Continued)

FOREIGN PATENT DOCUMENTS

DE   102006037479 A1    2/2008
DE   102008061042 A1 *  6/2010 ............ F16C 19/525
(Continued)

OTHER PUBLICATIONS http://www.bing.com/images/search?q=double+row+angular+contact+ball+bearings&view=detailv2&id=822FA5D5DEA5230D35B09A97F76CCF87D892B638&ccid=vJypUjAL&simid=607989502573281315&thid=OIP.Mbc9ca952300bc08442be2acbe25812bdo0&mode=overlay&first=1; Printed Apr. 4, 2016.*

(Continued)

*Primary Examiner* — Ruth Ilan
*Assistant Examiner* — Maurice L Williams
(74) *Attorney, Agent, or Firm* — Oliff PLC (57) ABSTRACT

An electric power steering system includes: a steered shaft, a housing containing the steered shaft therein in a movable manner; a ball screw nut engaged threadedly to the steered shaft via a plurality of balls and configured to move the steered shaft in an axial direction; a double row angular contact ball bearing configured to retain the ball screw nut and to support the retained ball screw nut rotatably relative to the housing; a wall portion placed at either side of the double row angular contact ball bearing in the axial direction of the steered shaft, the wall portion being formed integrally with the housing; and an elastic member provided between the wall portion and the outer ring portion and configured to (Continued)

retain the double row angular contact ball bearing to be elastically displaceable in the axial direction.

8 Claims, 9 Drawing Sheets

(51) Int. Cl.
    *F16C 23/08* (2006.01)
    *F16C 35/04* (2006.01)
    *F16C 35/067* (2006.01)
    *F16C 35/077* (2006.01)
    *F16C 25/08* (2006.01)
    *F16H 25/22* (2006.01)

(52) U.S. Cl.
    CPC .......... *F16C 25/083* (2013.01); *F16C 35/047* (2013.01); *F16C 35/067* (2013.01); *F16C 35/077* (2013.01); *F16C 19/185* (2013.01); *F16C 2326/24* (2013.01); *F16H 25/2204* (2013.01)

(58) Field of Classification Search
    CPC ...... F16C 27/08; F16C 35/047; F16C 35/067; F16C 35/07; F16C 35/077
    See application file for complete search history.

(56) References Cited

U.S. PATENT DOCUMENTS

| | | | | |
|---|---|---|---|---|
| 3,561,829 A * | 2/1971 | Heldt | .................. | F16C 19/28 384/557 |
| 3,861,344 A * | 1/1975 | Bergling | .............. | B63H 23/321 114/169 |
| 3,913,993 A * | 10/1975 | Ernst | .................... | F16C 19/184 192/45.006 |
| 4,033,645 A * | 7/1977 | Yamada | .................. | F16C 25/08 384/563 |
| 6,048,101 A * | 4/2000 | Rasmussen | ............. | F01C 21/02 384/517 |
| 6,481,898 B1* | 11/2002 | Yakura | .................... | F16C 33/30 384/450 |
| 6,502,995 B1* | 1/2003 | Ozsoylu | ............... | B62D 5/0448 384/496 |
| 6,536,953 B1* | 3/2003 | Cope | .................... | B65H 54/547 384/536 |
| 6,644,432 B1 | 11/2003 | Yost et al. | | |
| 8,591,120 B2* | 11/2013 | Ince | ........................ | F16C 25/08 384/493 |
| 8,689,927 B2* | 4/2014 | Yamamoto | .......... | B62D 5/0448 180/443 |
| 8,899,373 B2* | 12/2014 | Rupp | ................... | B62D 5/0448 180/444 |
| 8,915,715 B2* | 12/2014 | Schroppel | ............. | F03D 7/0224 416/174 |
| 2003/0019686 A1 | 1/2003 | Fukuda et al. | | |
| 2003/0168905 A1* | 9/2003 | Chung | .................... | B60B 37/10 301/36.2 |
| 2005/0205342 A1* | 9/2005 | Tatewaki | ............. | B62D 5/0424 180/444 |
| 2005/0226546 A1* | 10/2005 | Takemura | ............... | F16C 19/06 384/513 |
| 2006/0117880 A1 | 6/2006 | Osterlanger | | |
| 2006/0183583 A1 | 8/2006 | Sakaida et al. | | |
| 2007/0102229 A1* | 5/2007 | Murakami | ........... | B62D 5/0403 180/444 |
| 2007/0151794 A1 | 7/2007 | Mizutani et al. | | |
| 2007/0217725 A1* | 9/2007 | Budaker | ................ | F16C 27/066 384/536 |
| 2009/0080824 A1* | 3/2009 | Joki | ........................ | F16C 25/08 384/557 |
| 2009/0294203 A1* | 12/2009 | Okada | .................. | B62D 5/0448 180/444 |
| 2011/0135382 A1* | 6/2011 | Pajewski | ............... | F16B 21/183 403/326 |
| 2011/0220432 A1* | 9/2011 | Bugosh | ................. | B62D 5/0448 180/444 |
| 2012/0018242 A1* | 1/2012 | Yamamoto | ........... | B62D 5/0424 180/444 |
| 2012/0061168 A1* | 3/2012 | Hamakita | ............. | B62D 5/0409 180/444 |
| 2012/0106884 A1* | 5/2012 | Doerrfuss | ............. | F16C 19/163 384/493 |
| 2012/0106885 A1 | 5/2012 | Ince et al. | | |
| 2012/0111657 A1* | 5/2012 | Hamakita | ............. | B62D 5/0409 180/444 |
| 2013/0051719 A1* | 2/2013 | Tanabe | .................. | F16C 19/184 384/481 |
| 2013/0074626 A1 | 3/2013 | Speidel | | |
| 2013/0118827 A1* | 5/2013 | Imanishi | ............... | B62D 5/0409 180/443 |
| 2013/0161114 A1* | 6/2013 | Bando | ...................... | B62D 5/04 180/443 |
| 2013/0233637 A1* | 9/2013 | Rupp | ................... | B62D 5/0448 180/444 |
| 2013/0248280 A1* | 9/2013 | Stamm | ................. | B62D 5/0451 180/444 |
| 2014/0027196 A1* | 1/2014 | Kaneko | ................ | B62D 5/0448 180/444 |
| 2014/0169716 A1* | 6/2014 | Kullin | ................... | F16C 25/083 384/456 |
| 2014/0260727 A1* | 9/2014 | Webber | ................ | B62D 5/0424 74/89.23 |
| 2015/0075899 A1* | 3/2015 | Kikuchi | ............... | B62D 5/0409 180/444 |
| 2015/0274200 A1* | 10/2015 | Nakamura | ........... | B62D 5/0448 180/444 |

FOREIGN PATENT DOCUMENTS

| | | | | |
|---|---|---|---|---|
| DE | 102010003727 A1 * | 10/2011 | .......... | B62D 5/0409 |
| DE | 102010028153 A1 * | 10/2011 | .......... | B62D 5/0448 |
| DE | 102010029767 A1 * | 12/2011 | .......... | B62D 5/0448 |
| DE | 102010038715 A1 * | 2/2012 | .......... | B62D 5/0448 |
| DE | 102010054828 A1 * | 6/2012 | .......... | B62D 5/0448 |
| DE | 102011014079 A1 * | 9/2012 | ............ | F16C 23/086 |
| DE | 102011075321 A1 * | 11/2012 | ............ | F16C 19/525 |
| DE | 2600005 A1 * | 6/2013 | ............ | F04D 19/04 |
| EP | 1783031 A1 | 5/2007 | | |
| EP | 2594457 A2 | 5/2013 | | |
| JP | 2002-037096 A | 2/2002 | | |
| JP | 2003-002220 A | 1/2003 | | |
| JP | 2004-243945 A | 9/2004 | | |
| JP | 2005-096622 A | 4/2005 | | |
| JP | A-2006-509979 | 3/2006 | | |
| JP | 2006-224938 A | 8/2006 | | |
| JP | A-2006-224746 | 8/2006 | | |
| JP | A-2006-224945 | 8/2006 | | |
| JP | 2006-232048 A | 9/2006 | | |
| JP | 2007-303530 A | 11/2007 | | |
| JP | B2-4807655 | 11/2011 | | |
| JP | 2012-25246 A | 2/2012 | | |
| JP | 2012-148741 A | 8/2012 | | |
| JP | 2012-166718 A | 9/2012 | | |
| JP | 2013-119322 A | 6/2013 | | |
| JP | WO 201383518 A1 * | 12/2013 | .............. | F16C 41/02 |
| WO | WO 2009010364 A2 * | 1/2009 | .............. | F16C 27/04 |
| WO | WO 2011015374 A1 * | 2/2011 | .......... | B62D 5/0448 |
| WO | WO 2011/147824 A1 | 12/2011 | | |
| WO | 2012/079726 A1 | 6/2012 | | |

OTHER PUBLICATIONS http://www.schaeffler.com/remotemedien/media/_shared_media/05_products_services/rolling_bearings/radial_ball_bearings/angular_contact_ball_bearings/DoubleRowAngularContact_col2.jpg; Printed Apr. 4, 2016.* http://www.astbearings.com/catalog.html?category=double_row_ang_cont_bearing; Printed Apr. 4, 2016.*

(56) References Cited

OTHER PUBLICATIONS http://www.skf.com/group/products/bearings-units-housings/ball-bearings/angular-contact-ball-bearings/double-row-angular-contact-ball-bearings/index.html; Printed Apr. 4, 2016.*
http://www.ntn.co.jp/english/products/machine_tool.html; Printed Apr. 4, 2016.*
Nov. 1, 2017 Office Action issued in Japanese Patent Application No. 2013-108374.
Oct. 2, 2017 Search Report issued in French Patent Application No. FR1454610.
May 17, 2017 Office Action issued in Chinese Patent Application No. 201410217183.2.
Mar. 17, 2017 Office Action issued in Japanese Patent Application No. 2013-108374.
Dec. 26, 2017 Office Action issued in Chinese Patent Application No. 201410217183.2.
Feb. 20, 2017 Office Action issued in Japanese Patent Application No. 2013-108373.

* cited by examiner

ELECTRIC POWER STEERING SYSTEM

INCORPORATION BY REFERENCE

The disclosure of Japanese Patent Application No. 2013-108373 and 2013-108374 and 2013-108375 filed on May 22, 2013 including the specification, drawings and abstract is incorporated herein by reference in its entirety.

BACKGROUND OF THE INVENTION

1. Field of the Invention

The present invention relates to an electric power steering system.

2. Description of Related Art

International Publication No. 2011/147824 and Japanese Patent Application Publication No. 2006-224945 (JP 2006-224945 A) describe an electric power steering system (hereinafter referred to as "EPS") for assisting a steering operation of a driver by giving a power of a motor to a steering mechanism of a vehicle. For example, in the EPS, a rack-and-pinion mechanism is adopted as the steering mechanism. The mechanism converts a rotation of a pinion along with the steering operation into an axial movement of a rack shaft meshing with the pinion.

SUMMARY OF THE INVENTION

Figure 7:
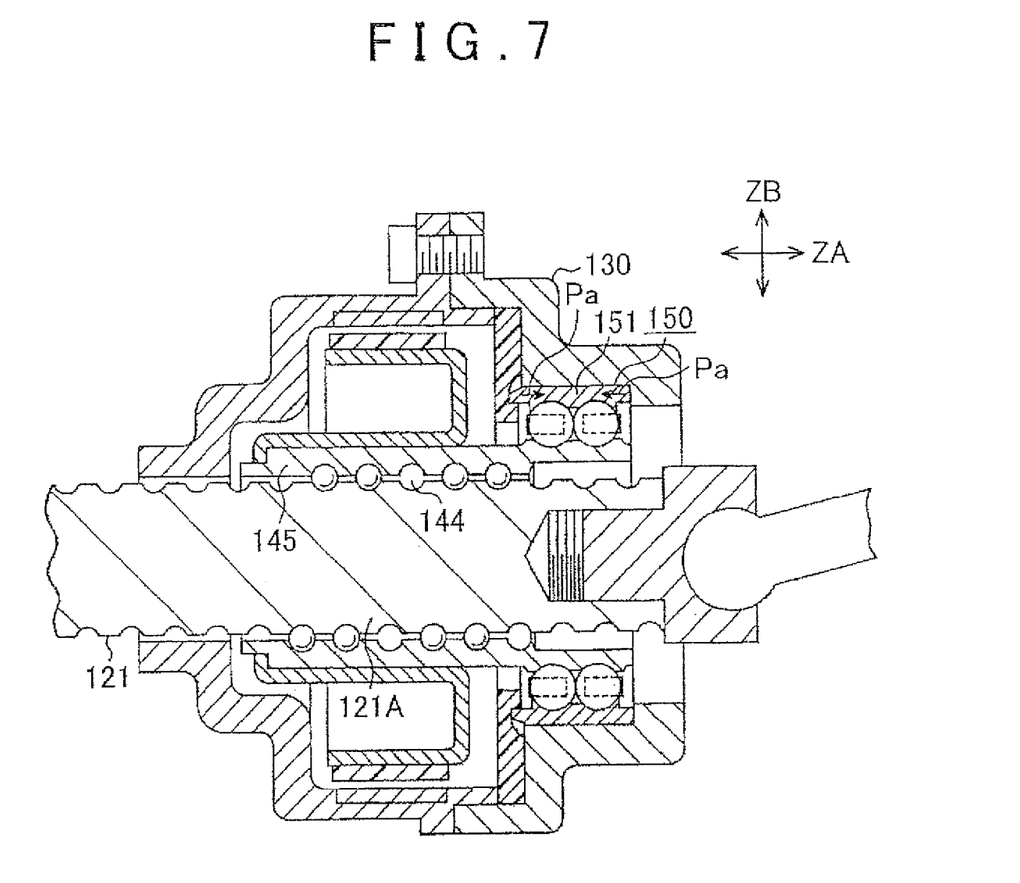
FIG. 7 is a sectional view of an electric power steering system according to a background art.

For example, as illustrated in FIG. 7, the EPS includes a housing 130, a rack shaft 121, a ball screw nut 145, balls 144, and a bearing 150. A threaded portion 121A is formed on an outer circumference of the rack shaft 121, and the ball screw nut 145 is engaged threadedly to the threaded portion 121A via a plurality of balls 144. The bearing 150 is provided between an inner peripheral surface of the housing 130 and an outer peripheral surface of the ball screw nut 145. The bearing 150 is sandwiched between both sides of the housing 130 in an axial direction ZA. A double row angular contact ball bearing, for example, is adopted as the bearing 150 (e.g., see Published Japanese Translation of PCT application No. 2006-509979 (JP-A 2006-509979)).

In the above configuration, when a steering is operated to rotate, a force in the axial direction ZA is added to the rack shaft 121 via a pinion. Hereby, the rack shaft 121 slightly moves in the axial direction ZA. This movement is not accompanied with a rotation of the ball screw nut 145. Along with the movement of the rack shaft 121, the bearing 150 (particularly, its outer ring portion 151) receives a reaction force Pa from the housing 130. In view of this, it is necessary for the outer ring portion 151 to be formed thick in consideration of the reaction force Pa. Accordingly, it is difficult to achieve compactification of a size of the EPS in a radial direction ZB.

Figure 8:
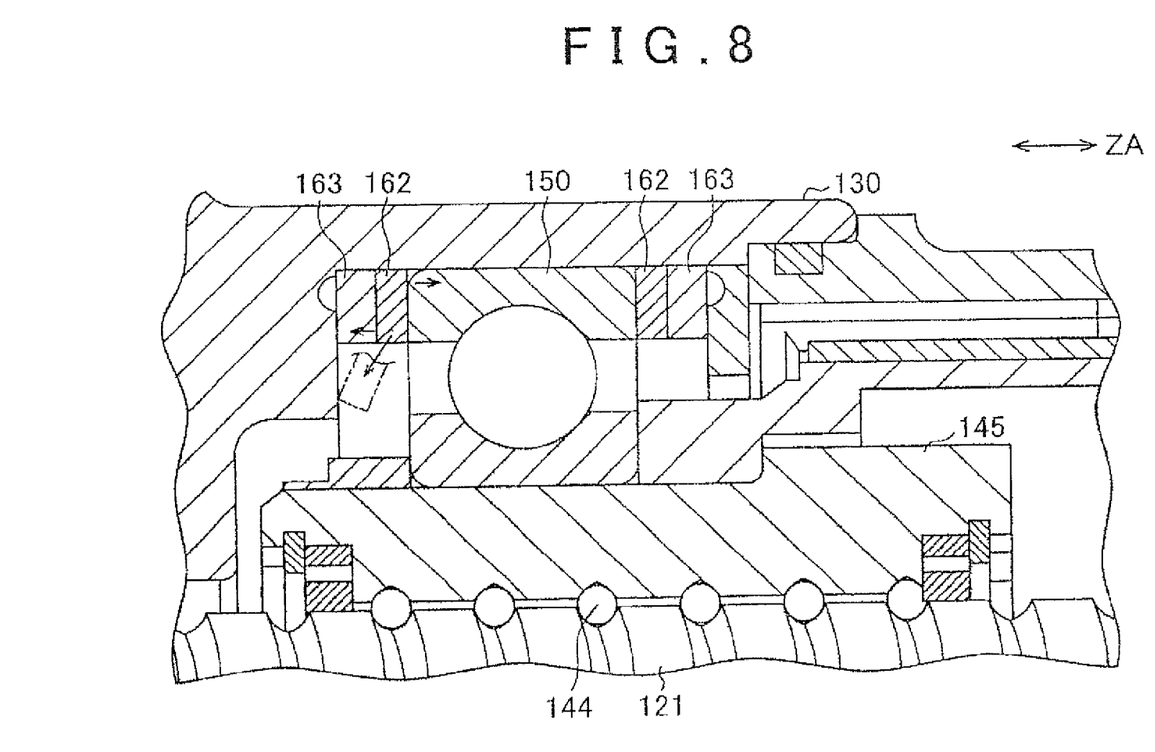
FIG. 8 is a sectional view of an electric power steering system according to a background art.

Further, for example, as illustrated in FIG. 8, an EPS includes a housing 130, a rack shaft 121, a ball screw nut 145, balls 144, a bearing 150, elastic springs 162, and plates 163.

A threaded portion is formed on an outer circumference of the rack shaft 121, and the ball screw nut 145 is engaged threadedly to the threaded portion via a plurality of balls 144. The bearing 150 is provided between an inner peripheral surface of the housing 130 and an outer peripheral surface of the ball screw nut 145. The elastic spring 162 and the plate 163 each having a tonic shape are provided in a gap between the bearing 150 and the housing 130 in an axial direction ZA of the rack shaft 121.

The elastic spring 162 is a metal waved washer, coned disc spring, or the like, for example. The plate 163 is provided between the housing 130 and the elastic spring 162, in order to prevent the elastic spring 162 from making contact with the housing 130.

The elastic spring 162 applies its own elastic force to the plate 163 and the bearing 150 (more precisely, a side surface of its outer ring 150a). The bearing 150 is retained to be elastically displaceable along the axial direction ZA of the rack shaft 121 due to biasing forces from the elastic springs 162.

In the above configuration, when a steering is operated to rotate, a force in the axial direction ZA is added to the rack shaft 121 via a pinion. Hereby, the rack shaft 121 slightly moves in the axial direction ZA. This movement is not accompanied with a rotation of the ball screw nut 145. Along with the movement of the rack shaft 121, the bearing 150 moves integrally with the ball screw nut 145 in the axial direction ZA against the biasing force from the elastic spring 162. In this state, when a rotational force is added to the ball screw nut 145 via a motor (not shown), a rotation of the ball screw nut 145 is started smoothly. Hereby, the rack shaft 121 starts to move in the axial direction ZA smoothly.

A vibration from a road surface may be added to the EPS via tires. In this case, in the configuration, the elastic spring 162 may fall mainly in a gravitational direction along with the vibration. Hereby, as illustrated by an alternate long and two short dashes line in FIG. 8, the elastic spring 162 is displaced with respect to the plate 163, so that an end portion of the elastic spring 162 interferes the housing 130, which may abrade the housing 130. Further, due to the displacement of the elastic spring 162, it may be difficult to elastically retain the bearing 150 appropriately.

Figure 9:
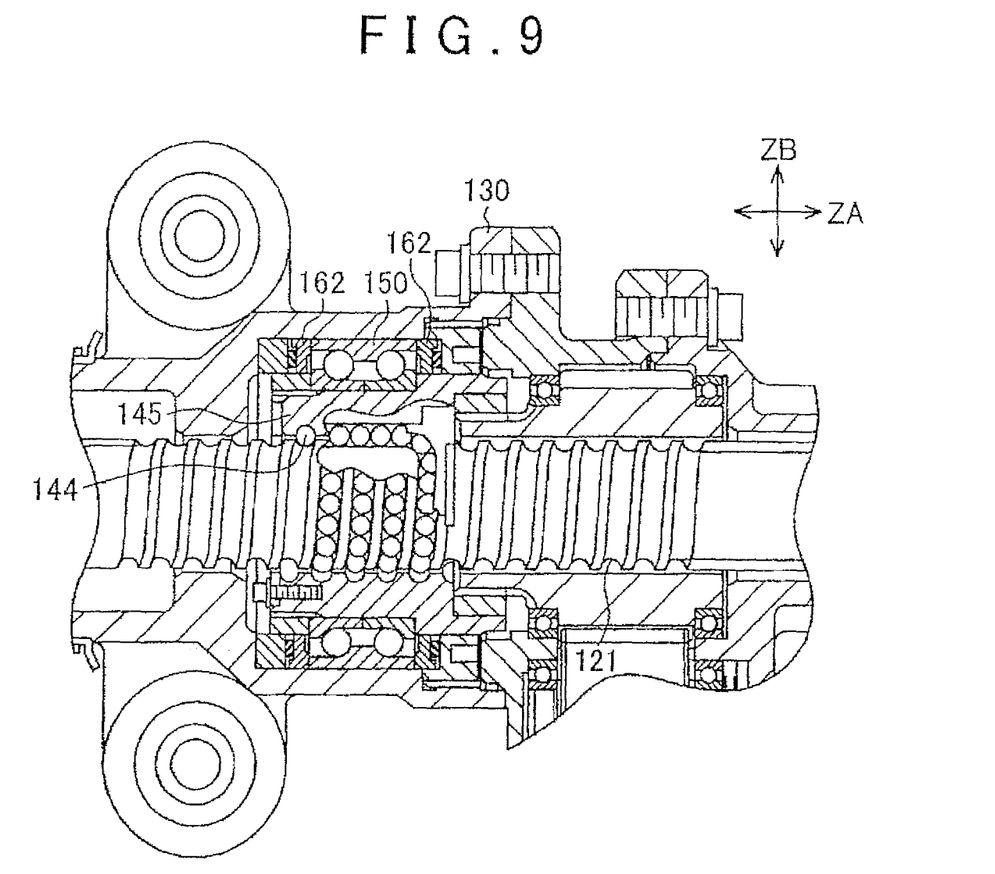
FIG. 9 is a sectional view of an electric power steering system according to a background art.

Further, for example, as illustrated in FIG. 9, an EPS described in Japanese Patent No. 4807655 includes a housing 130, a steered shaft 121, a ball screw nut 145, balls 144, and a bearing 150. A threaded portion is formed on an outer circumference of the steered shaft 121, and the ball screw nut 145 is engaged threadedly to the threaded portion via a plurality of balls 144. The bearing 150 is provided between an inner peripheral surface of the housing 130 and an outer peripheral surface of the ball screw nut 145. An elastic spring 162 is provided in a gap between the bearing 150 and the housing 130 in an axial direction of the steered shaft 121. The bearing 150 is sandwiched between the elastic members 162 in an elastically displaceable manner. A pulley is supported at both ends thereof and a load due to tension of a timing belt is not applied to the bearing 150.

In the above configuration, when a steering is operated to rotate, a force in an axial direction ZA is added to the steered shaft 121 via a pinion. Hereby, the steered shaft 121 slightly moves in the axial direction ZA. This movement is not accompanied with a rotation of the ball screw nut 145. Along with the movement of the steered shaft 121, the ball screw nut 145 and the bearing 150 move integrally in the axial direction. Along with the movement of the bearing 150, the elastic member 162 is elastically deformed. In this state, when a rotational force is added to the ball screw nut 145 via a motor (not shown), a rotation of the ball screw nut 145 is started smoothly. Hereby, the steered shaft 121 starts to move in the axial direction ZA smoothly.

However, particularly, in a case where a double row angular contact ball bearing is adopted as the bearing 150, a contact area between the bearing 150 and the inner peripheral surface of the housing 130 becomes large. Accordingly, due to a frictional resistance between the bearing 150 and the inner peripheral surface of the housing 130, a smooth movement of the bearing 150 may be disturbed. Because of this, there is a possibility that a smooth movement start of the steered shaft 121 is not realized sufficiently. A similar problem can occur in a single row bearing.

The present invention provides an electric power steering system configured to have a more compact size in a radial direction.

Further, the present invention provides an electric power steering system in which displacement of an elastic spring to a gravitational direction is restrained.

Further, the present invention provides an electric power steering system in which a frictional resistance of a bearing with respect to a housing is reduced.

An electric power steering system according to an aspect of the present invention includes: a steered shaft configured to move in an axial direction along with a rotation of a steering; a housing containing the steered shaft therein so that the steered shaft is movable in the axial direction; a ball screw nut engaged threadedly to the steered shaft via a plurality of balls and configured to move the steered shaft in the axial direction when the ball screw nut is rotationally driven via a drive source; a double row angular contact ball bearing including a torte outer ring portion having an outer peripheral surface making contact with an inner peripheral surface of the housing, a toric inner ring portion placed inside the outer ring portion and retaining the ball screw nut thereinside, and balls configured to roll between the outer ring portion and the inner ring portion and arranged in several lines along the axial direction, the double row angular contact ball bearing configured to support the ball screw nut rotatably relative to the housing; a pulley fixed to the screw nut beside the double row angular contact ball bearing, the pulley being driven by the drive source; a wall portion placed at either side of the double row angular contact ball bearing in the axial direction of the steered shaft, the wall portion being formed integrally with the housing; and an elastic member provided between the wall portion and the outer ring portion and configured to retain the double row angular contact ball bearing to be elastically displaceable in the axial direction.

According to the above aspect, when the steered shaft slightly moves in the axial direction along with a rotation of a steering, the ball screw nut and the double row angular contact ball bearing integrally move relative to the steered shaft against an elastic force of the elastic member. When the ball screw nut and the bearing are moved as such, it is possible to easily rotate the ball screw nut relative to the steered shaft via a drive source afterward, and eventually to easily move the steered shaft in the axial direction.

Further, according to the above aspect, since the elastic member is provided between the double row angular contact ball bearing and the housing (the wall portion), it is possible to reduce a reaction force that the outer ring portion receives from the housing (the wall portion) at the time when the bearing moves. This makes it possible to form the outer ring portion thinly, and eventually to configure the electric power steering system in a further compact manner in terms of a size in the radial direction.

In the above aspect a ball retaining hole configured to retain the balls in a rollable manner may be formed on an inner peripheral surface of the outer ring portion, and a raceway bottom thicknesses from a vertex of the ball retaining hole in the outer ring portion to an outer surface of the outer ring portion may be set to 25% to 30% of a ball diameter.

According to this configuration, the raceway bottom thickness in the outer ring portion of the double row angular contact ball bearing is set to 25% to 30% of the ball diameter. Thus, even if the raceway bottom thickness is set thinner than a conventionally general outer ring portion, it is possible to reduce the reaction force that the outer ring portion in the bearing receives from the housing (the wall portion), as described above. This makes it possible to maintain durability, and to configure the double row angular contact ball bearing in a further compact manner in terms of a size in the radial direction.

In the above aspect, the electric power steering system may further include a plate including a retaining portion configured to support the elastic member from a direction opposed to a gravitational direction, the plate being provided between the elastic member and the wall portion.

According to the configuration, the retaining portion of the plate supports the elastic member from the direction opposed to the gravitational direction. Accordingly, even in a case where a vibration is added to the electric power steering system along with running of a vehicle, for example, it is possible to prevent the elastic member from being displaced to the gravitational direction.

In the above configuration, the elastic member may be formed in a tonic shape, and the retaining portion may be formed at an inner circumferential side of the elastic member over a whole circumference of the elastic member.

According to this configuration, the retaining portion is formed at the inner circumferential side of the elastic member over the whole circumference of the elastic member. Accordingly, regardless of a positional relationship in the circumferential direction between the plate and the elastic member after assembly, part of the retaining portion supports the elastic member from the direction opposed to the gravitational direction. Accordingly, it is possible to improve degrees of freedom of assembly at the time when a component in which the elastic member is fitted into the plate is assembled between the bearing and the wall portion.

In the above configuration, the elastic member may be a coned disc spring configured to press a whole circumference of a side surface of the outer ring portion of the double row angular contact ball bearing and a whole circumference of the plate in a direction to be separated from each other.

The double row angular contact ball bearing can be configured such that the outer ring portion is made thinner than that in a single row bearing or the like. This is because, generally in the double row angular contact ball bearing, the number of balls between the outer ring portion and the inner ring portion is large, so that a load to be added to the outer ring portion can be distributed via the balls. According to the above configuration, when a coned disc spring is adopted as the elastic member, it is possible to press the side surface of the outer ring portion of the bearing by the coned disc spring over a whole circumference thereof. Accordingly, even in a case of the double row angular contact ball bearing including the thin outer ring portion, it is possible to stably restrain the bearing elastically.

In the above configuration, the electric power steering system may further include a recessed portion faulted on a surface where the outer peripheral surface of the bearing makes contact with the inner peripheral surface of the housing.

According to the above configuration, the recessed portion is formed on a contact surface between the bearing and the housing. The recessed portion reduces a contact area between the bearing and the housing. In view of this, as described above, it is possible to reduce a sliding friction of the bearing with respect to the housing at the time when the ball screw nut and the bearing move integrally.

In the above configuration, the recessed portion may be formed on the outer peripheral surface of the double row angular contact ball bearing. Alternatively, the recessed portion may be formed on the inner peripheral surface of the housing.

In the above configuration, the recessed portion may be filled with lubricant. According to this configuration, since the recessed portion is filled with the lubricant, it is possible to further reduce the sliding friction of the bearing with respect to the housing.

According to the present invention, it is possible to configure an electric power steering system in a further compact manner in terms of a size in a radial direction.

According to the present invention, it is further possible to restrain displacement of an elastic spring to a gravitational direction.

According to the present invention, it is further possible to reduce a frictional resistance of a bearing with respect to a housing.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
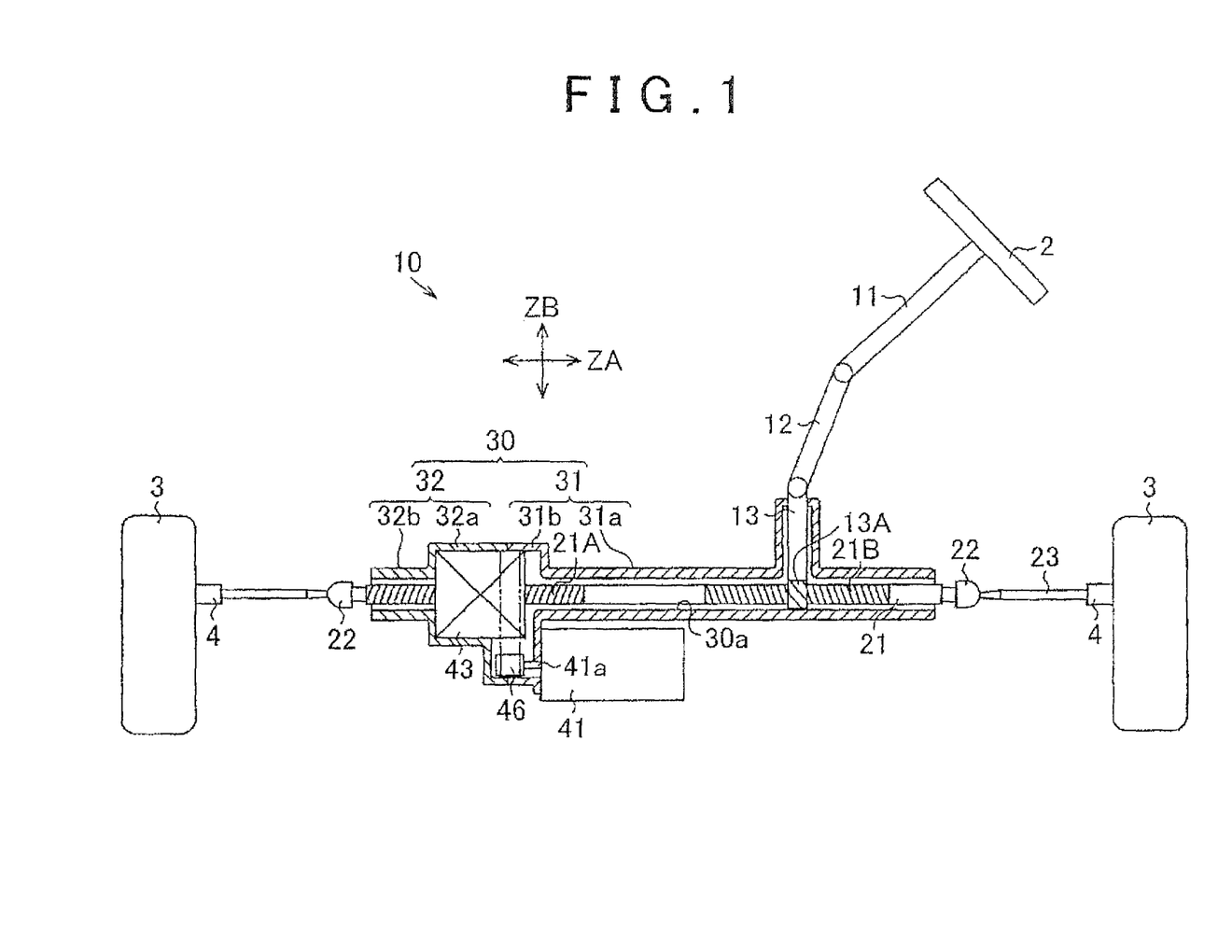
FIG. 1 is a schematic diagram illustrating an electric power steering system according to one embodiment of the present invention.

One embodiment of an electric power steering system of the present invention is described below with reference to FIGS. 1 to 4. As illustrated in FIG. 1, an electric power steering system 10 includes a rack shaft 21, a housing 30, and a pinion gear 13A.

The rack shaft 21 is formed into a cylindrical shape. Here, a right-and-left direction in FIG. 1 is prescribed as an axial direction ZA of the rack shaft 21, and a direction orthogonal to the axial direction ZA is prescribed as a radial direction ZB of the rack shaft 21.

The housing 30 is formed of aluminum and has a through hole 30a penetrating therethrough in the axial direction ZA (the right-and-left direction in the figure) of the rack shaft 21. The rack shaft 21 is inserted into the through hole 30a of the housing 30 in a movable manner in its axial direction ZA. On an outer circumference of the rack shaft 21 on a right side from its center in the figure, a rack gear 21B is formed over a given range.

The pinion gear 13A is placed so as to engage with the rack gear 21B in the rack shaft 21. The pinion gear 13A rotates via a column shaft 11, an intermediate shaft 12, and a pinion shaft 13 according to a rotating operation of the steering 2. When the pinion gear 13A rotates, the rack shaft 21 is able to move in the axial direction.

Respective ball joints 22 are connected to right and left end faces of the rack shaft 21, and tie rods 23 are further connected to the respective ball joints 22. Further, knuckles 4 are connected to tips of the respective tie rods 23. When the rack shaft 21 moves in the axial direction ZA, a force is transmitted to steered wheels 3 via the tie rods 23 and the knuckles 4, so as to change a steered angle of the steered wheels 3.

The housing 30 includes a first housing portion 31 and a second housing portion 32. The housing portions 31, 32 are configured to be connectable and disconnectable with each other in the axial direction ZA. The first housing portion 31 is constituted by a body portion 31a having a tubular shape following an outer shape of the rack shaft 21, and a left end portion 31b having a tubular shape with a diameter larger than that of the body portion 31a. That is, the first housing portion 31 is formed into a stepped cylindrical shape in which the body portion 31a and the left end portion 31b are connected to each other. The second housing portion 32 is fitted into the first housing portion 31 from a left side in the figure. A right end portion 32a of the second housing portion 32 is formed into a cylindrical shape having the same diameter same as the left end portion 31b of the first housing portion 31. Further, a left portion 32b of the second housing portion 32 is formed into a cylindrical shape having the same diameter same as the body portion 31a of the first housing portion 31. The second housing portion 32 is fitted into the left end portion 31b of the first housing portion 31 via the right end portion 32a thereof.

A motor 41 as a drive source is provided below the body portion 31a of the first housing portion 31. An output shaft 41a of the motor 41 extends toward the left side in the figure and is inserted into the right end portion 32a of the second housing portion 32.

Figure 2:
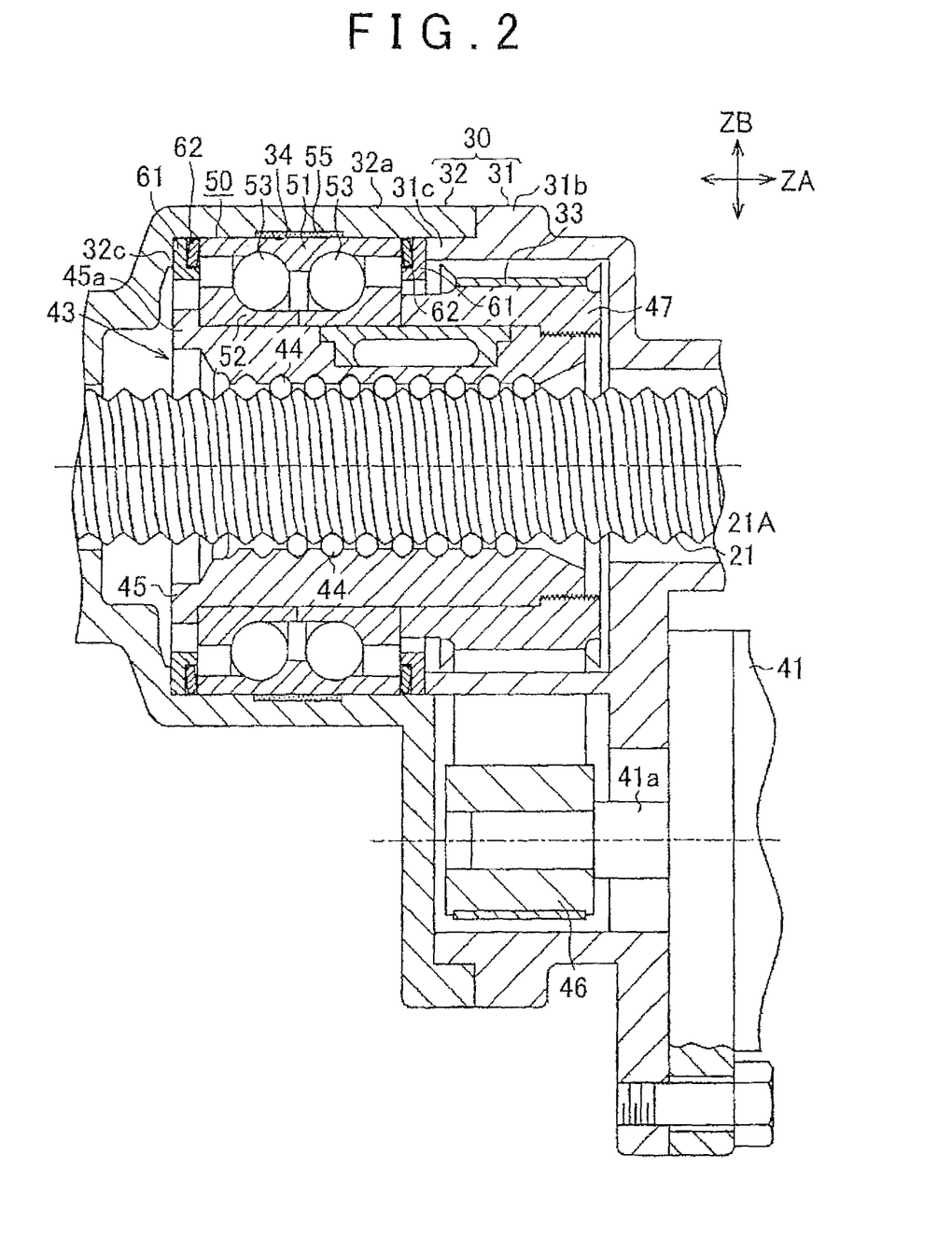
FIG. 2 is a local sectional view illustrating the electric power steering system according to one embodiment of the present invention.

As illustrated in FIG. 2, a drive pulley 46, a driven pulley 47, a timing belt 33, and a ball screw mechanism 43 are received in an internal space formed by the right end portion 32a of the second housing portion 32 and the left end portion 31b of the first housing portion 31. The drive pulley 46 is fixed to the output shaft 41a of the motor 41. Accordingly, the drive pulley 46 rotates integrally with the output shaft 41a.

As illustrated in FIG. 1, a threaded portion 21A is formed on an outer circumference of the rack shaft 21 in a given range from its left end. The ball screw mechanism 43 is provided on an outer circumference of the threaded portion 21A. More specifically, as illustrated in FIG. 2, the ball screw mechanism 43 includes a ball screw nut 45, and many balls 44. The ball screw nut 45 is engaged threadedly to the rack shaft 21 via the many balls 44 arranged along the threaded portion 21A. The ball screw nut 45 is placed between the first housing portion 31 and the second housing portion 32 in the housing 30.

The driven pulley 47 is engaged threadedly to an outer circumference of a first-housing-portion-31 side of the ball screw nut 45. This allows the ball screw nut 45 and the driven pulley 47 to rotate integrally.

The timing belt 33 is provided over the driven pulley 47 and the drive pulley 46. Accordingly, a rotation of the output shaft 41a in the motor 41 is transmitted from the drive pulley 46 to the driven pulley 47 via the timing belt 33, and eventually transmitted to the ball screw nut 45.

Further, a double row angular contact ball bearing 50 is provided between an outer peripheral surface of the ball screw nut 45 and an inner peripheral surface of the second housing portion 32. The double row angular contact ball bearing 50 is longer in the axial direction ZA and thinner in the radial direction ZB than those of a single row bearing or the like.

Figure 3:
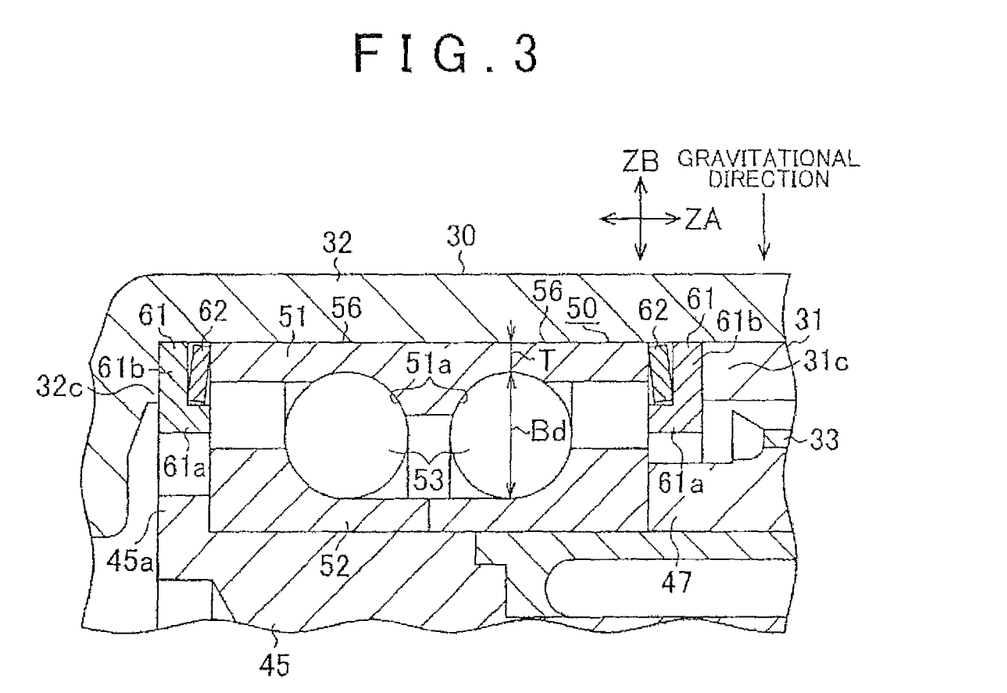
FIG. 3 is a local sectional view illustrating the electric power steering system according to one embodiment of the present invention.

More specifically, as illustrated in FIG. 3, the double row angular contact ball bearing 50 includes an outer ring portion 51, an inner ring portion 52, and balls 53. The inner ring portion 52 is formed generally in a tonic shape. The ball screw nut 45 is fitted inside the inner ring portion 52. This accordingly allows the double row angular contact ball bearing 50 to support the ball screw nut 45 relatively with high rigidity even in a cantilever manner, thereby making it possible to restrain an inclination of the ball screw nut 45 caused due to a tension of the timing belt 33.

The outer ring portion 51 is also formed generally in a toric shape. An outer peripheral surface of the outer ring portion 51 makes contact with the inner peripheral surface of the second housing portion 32. Ball retaining holes 51a along a circumferential direction of the outer ring portion 51 are formed on an inner peripheral surface of the outer ring portion 51.

The ball retaining hole 51a has a curved surface following a peripheral surface of the ball 53. Two ball retaining holes 51a are formed along the axial direction ZA. A thickness from a vertex of the ball retaining hole 51a to a top surface of the outer ring portion 51 is prescribed as a raceway bottom thickness T. The raceway bottom thickness T is set to 25% to 30% of a ball diameter Bd. The raceway bottom thickness T is thinned as much as possible while intensity of the outer ring portion 51 is taken into consideration. The balls 53 are filled in each of the ball retaining holes 51a. In this state, the balls 53 are rollable according to a relative rotation between the outer ring portion 51 and the inner ring portion 52.

As illustrated in FIG. 3, a flange 45a projecting in the radial direction ZB is formed on that outer peripheral edge portion of the ball screw nut 45 which is on a side opposite to the driven pulley 47. The double row angular contact ball bearing 50 (more precisely, the inner ring portion 52) is placed between the flange 45a and the driven pulley 47, on the outer peripheral surface of the ball screw nut 45.

A wall portion 31c is placed in a tip of the first housing portion 31 on an outer-ring-portion-51 side thereof. Further, a wall portion 32c is placed in that part of the second housing portion 32 which is spaced from the outer ring portion 51 in the axial direction ZA. A plate 61 and a metal spring 62 are disposed in a gap between the outer ring portion 51 and each of the wall portions 31e, 32c in the axial direction ZA.

The metal spring 62 is a metal coned disc spring having a toric shape. Further, the plate 61 is provided for the purpose of preventing the metal spring 62 from making contact with the housing 30, and is formed of iron in a toric shape so as to have an L-shaped cross section. That is, the plate 61 is constituted by a retaining portion 61a extending in a short direction and an abrasion prevention portion 61b extending in a longitudinal direction. An outside diameter of the retaining portion 61a is set in accordance with an inside diameter of the metal spring 62. Accordingly, the metal spring 62 is fitted into the plate 61 (the retaining portion 61a). In this state, the retaining portion 61a is placed inside the metal spring 62 over a whole circumference thereof.

As illustrated in FIG. 3, the plate 61 is provided on an outer peripheral side of the ball screw nut 45 so as to be placed between the outer ring portion 51 and each of the wall portions 31c, 32c in a state where the plate 61 retains the metal spring 62 thereinside. That is, the retaining portion 61a of the plate 61 is placed at an inner side of the metal spring 62 (a rotation center side of the rack shaft 21) and the abrasion prevention portion 61b of the plate 61 is placed at that side of the metal spring 62 which faces the each of the wall portions 31c, 32c.

Further, a ball-screw-nut-45 side of the metal spring 62 presses the abrasion prevention portion 61b by making contact with the abrasion prevention portion 61b, and that side of the metal spring 62 which is opposite to the ball screw nut 45 presses the double row angular contact ball bearing 50 by making contact with a side peripheral surface of the outer ring portion 51. Thus, the double row angular contact ball bearing 50 is retained at that position due to elastic forces from the metal springs 62 on both sides.

Figure 4:
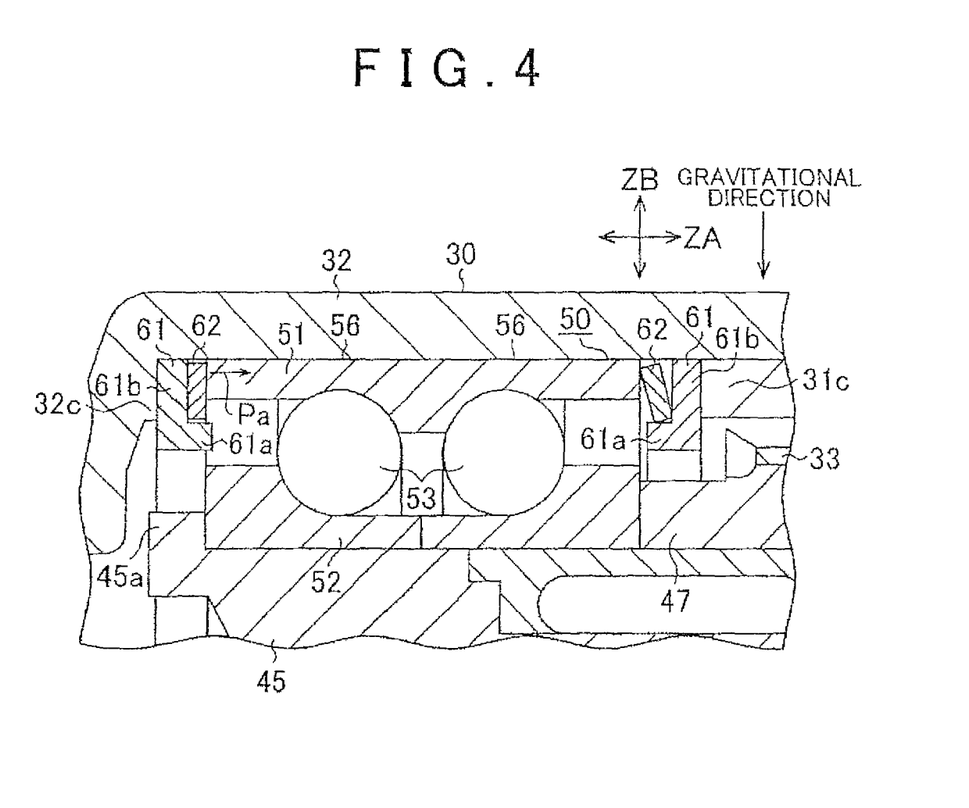
FIG. 4 is a local sectional view illustrating the electric power steering system when a bearing moves, according to one embodiment of the present invention.

The following describes an operation of the electric power steering system 10. As illustrated in FIG. 1, when the steering 2 is operated, a force in the axial direction ZA is added to the rack shaft 21 via the pinion gear 13A, the rack gear 21B, and the like. Hereby, as illustrated in FIG. 4, the rack shaft 21 slightly moves to a left direction.

Along with this, the double row angular contact ball bearing 50 (the outer ring portion 51) compresses one of the metal springs 62 (the one on the left side in the figure), and stretches the other one of the metal springs 62, so that the double row angular contact ball bearing 50 moves in the left direction integrally with the ball screw nut 45.

The movements of the double row angular contact ball bearing 50 and the ball screw nut 45 cause the ball screw nut 45 to rotate smoothly afterward along with driving of the motor (the drive source) 41. The same operation is performed when the rack shaft 21 slightly moves in a right direction.

As such, when the metal spring 62 is placed on either side of the double row angular contact ball bearing 50 in an elastically deformable manner, it is possible to reduce a reaction force Pa received from the housing 30 (the wall portions 31e, 32c) along with the movement of the double row angular contact ball bearing 50. Accordingly, it is possible to restrain a decrease of durability even if the outer ring portion 51 is thinned as described above. Note that the reaction force Pa is determined according to a rate of spring of the metal spring 62.

Further, even in a case where a vibration is added to the electric power steering system 10 via the steered wheels 3, displacement of the metal spring 62 to a gravitational direction is regulated by the retaining portion 61a of the plate 61.

As illustrated in FIG. 3, the bearing 50 includes the outer ring portion 51, the inner ring portion 52, and the balls 53. The inner ring portion 52 is formed generally in a tonic shape. The ball screw nut 45 is fitted inside the inner ring portion 52.

The outer ring portion 51 is also formed generally in a tonic shape. The outer peripheral surface of the outer ring portion 51 makes contact with the inner peripheral surface of the second housing portion 32. A plurality of balls 53 is placed between the outer ring portion 51 and the inner ring portion 52 in a rollable manner along a circumferential direction of the bearing 50. In the bearing 50 according to the present embodiment, the plurality of balls 53 arranged along the circumferential direction of the bearing 50 are provided in two lines along the axial direction ZA. Thus, since the balls are provided in two lines along the axial direction ZA, the bearing 50 has a shape elongated in the axial direction ZA. The inner ring portion 52 rotates integrally with the ball screw nut 45. At this time, the inner ring portion 52 rotates the balls 53 between the inner ring portion 52 and the outer ring portion 51.

The flange 45a projecting in the radial direction ZB is formed on that outer peripheral edge portion of the ball screw nut 45 which is on a side opposite to the driven pulley 47. The bearing 50 (more precisely, the inner ring portion 52) is placed between the flange 45a and the driven pulley 47, on the outer peripheral surface of the ball screw nut 45.

As illustrated in FIG. 2, the wall portion 31c is placed in the tip of the first housing portion 31 on the outer-ring-portion-51 side. Further, the wall portion 32c is placed in that part of the second housing portion 32 which is spaced from the outer ring portion 51 in the axial direction ZA. The plate 61 and the metal spring 62 are disposed in the gap between the outer ring portion 51 and each of the wall portions 31c, 32e in the axial direction ZA.

Figure 5:
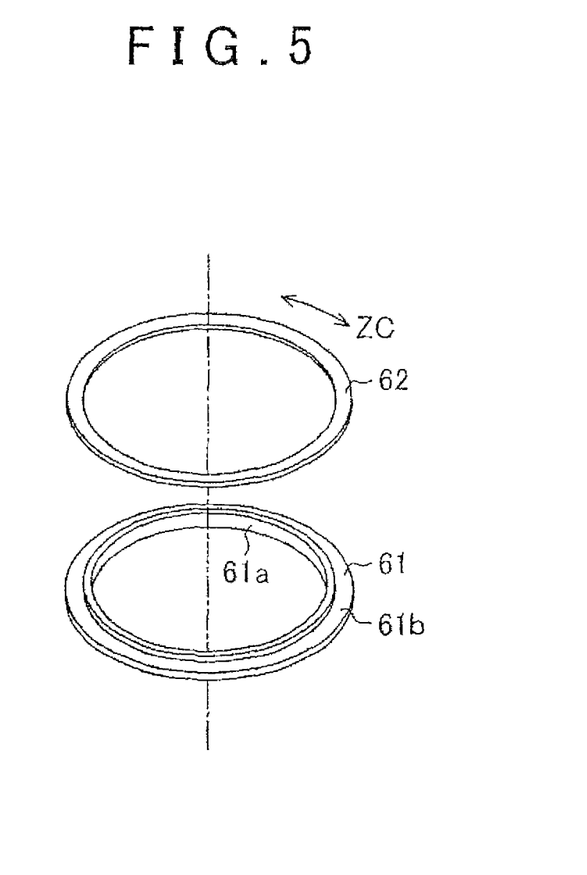
FIG. 5 is an exploded perspective view of a plate and a metal spring in one embodiment of the present invention.

As illustrated in FIG. 5, the metal spring 62 is a metal coned disc spring having a tonic shape. Further, the plate 61 is formed of iron in a tonic shape so as to have an L-shaped cross section. That is, the plate 61 is constituted by the retaining portion 61a as a short side and the abrasion prevention portion 61b as a longitudinal side. The outside diameter of the retaining portion 61a is set in accordance with the inside diameter of the metal spring 62. Accordingly, the metal spring 62 is fitted into the plate 61 (the retaining portion 61a). In this state, the retaining portion 61a is placed inside the metal spring 62 over a whole circumference thereof.

As illustrated in FIG. 3, the plate 61 is provided on the outer peripheral side of the ball screw nut 45 so as to be placed between the outer ring portion 51 and each of the wall portions 31c, 32c in a state where the plate 61 retains the metal spring 62 thereinside. That is, the retaining portion 61a of the plate 61 is placed at the inner side of the metal spring 62 (the rotation center side of the rack shaft 21) and the abrasion prevention portion 61b of the plate 61 is placed at that side of the metal spring 62 which faces the each of the wall portions 31e, 32c.

Further, the ball-screw-nut-45 side (a lower side in the figure) of the metal spring 62 presses the abrasion prevention portion 61b by making contact with the abrasion prevention portion 61b, and that side (an upper side in the figure) of the metal spring 62 which is opposite to the ball screw nut 45 presses the bearing 50 by making contact with the side peripheral surface of the outer ring portion 51. The bearing 50 is retained at that position by elastic forces from the metal springs 62 on both sides.

The following describes the operation of the electric power steering system 10. As illustrated in FIG. 1, when the steering 2 is operated, a force in the axial direction ZA is added to the rack shaft 21 via the pinion gear 13A, the rack gear 21B, and the like. Hereby, the rack shaft 21 slightly moves to a direction according to an operation direction of the steering 2. This movement of the rack shaft 21 is not accompanied with a rotation of the ball screw nut 45. Accordingly, the bearing 50 compresses one of the metal springs 62, and moves integrally with the ball screw nut 45. Such slight movements of the bearing 50 and the ball screw nut 45 cause the ball screw nut 45 to rotate smoothly afterward along with driving of the motor (the drive source) 41, and eventually cause the rack shaft 21 to smoothly move in the axial direction.

Further, even in a case where a vibration is added to the electric power steering system 10 via the steered wheels 3, displacement of the metal spring 62 to the gravitational direction is regulated by the retaining portion 61a of the plate 61.

Figure 6:
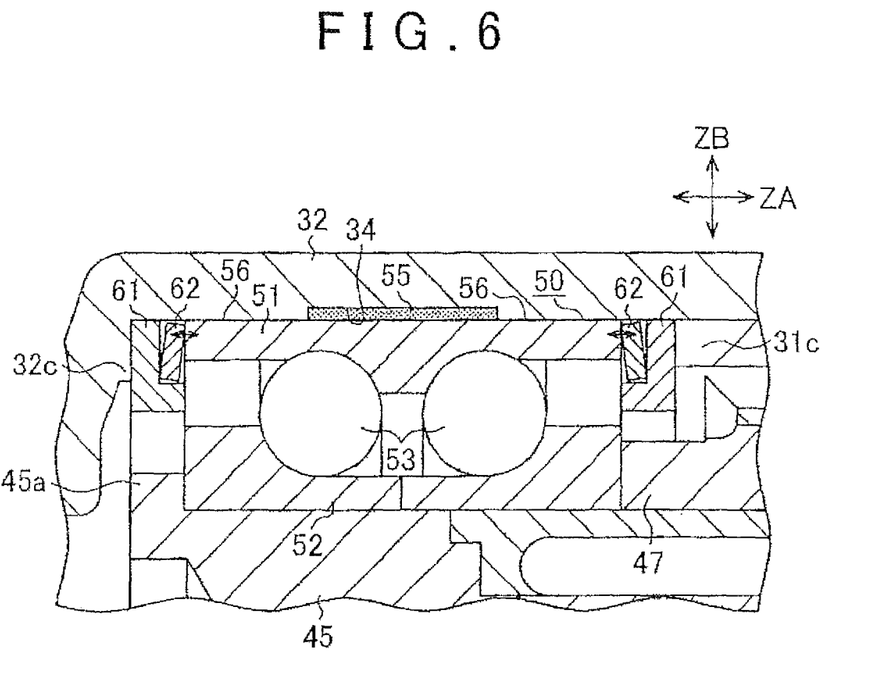
FIG. 6 is a magnified view of FIG. 2.

As illustrated in FIG. 6, the bearing 50 includes the outer ring portion 51, the inner ring portion 52, and the balls 53. The inner ring portion 52 is formed generally in a toric shape. The ball screw nut 45 is fitted inside the inner ring portion 52. The outer ring portion 51 is also formed generally in a tonic shape. The outer peripheral surface of the outer ring portion 51 makes contact with the inner peripheral surface of the second housing portion 32. The plurality of balls 53 is placed between the outer ring portion 51 and the inner ring portion 52 in a rollable manner. In the bearing 50 according to the present embodiment, the plurality of balls 53 arranged along the circumferential direction of the bearing 50 are provided in two lines along the axial direction ZA. The inner ring portion 52 rotates integrally with the ball screw nut 45. At this time, the inner ring portion 52 rotates relative to the outer ring portion 51, while rotating the balls 53.

A recessed portion 34 is formed on that inner peripheral surface of the second housing portion 32 which makes contact with the bearing 50. The recessed portion 34 is formed in a toric shape. The recessed portion 34 is filled with grease 55 serving as lubricant. The grease 55 seeps out to those contact surfaces 56 which are formed on both sides in the recessed portion 34 in the axial direction ZA and on which the bearing 50 makes contact with the second housing portion 32. Due to the recessed portion 34 and the grease 55, a sliding friction of the bearing 50 with respect to the inner peripheral surface of the second housing portion 32 is reduced.

As illustrated in FIG. 6, the flange 45a projecting in the radial direction ZB of the ball screw nut 45 is formed on that outer peripheral edge portion of the ball screw nut 45 which is on a side opposite to the driven pulley 47. The bearing 50 (more precisely, the inner ring portion 52) is placed between the flange 45a and the driven pulley 47, on the outer peripheral surface of the ball screw nut 45.

The wall portion 31c is formed in the tip of the first housing portion 31 in the outer-ring-portion-51 side. Further, the wall portion 32c is formed in that part of the second housing portion 32 which is spaced from the outer ring portion 51 in the axial direction ZA. The plate 61 and the metal spring 62 are disposed in the gap between the outer ring portion 51 and each of the wall portions 31e, 32c in the axial direction ZA.

The metal spring 62 is a torte coned disc spring or a waved washer, and provided at a position where the metal spring 62 make contact with a side surface of the outer ring portion 51. The metal spring 62 is one example of an elastic retaining portion. The plate 61 is formed of iron in a tone shape so as to have an L-shaped cross section.

The plate 61 is placed between the metal spring 62 and each of the wall portions 31c, 32c in a state where the plate 61 retains the metal spring 62 thereinside. The outer ring portion 51 is retained at that position by elastic forces from the metal springs 62 on both sides.

The following describes the operation of the electric power steering system 10. As illustrated in FIG. 1, when the steering 2 is operated, a force in the axial direction ZA is added to the rack shaft 21 via the pinion gear 13A, the rack gear 21S, and the like. Hereby, the rack shaft 21 slightly moves to a direction according to an operation direction of the steering 2. Accordingly, the bearing 50 compresses the metal spring 62, and moves integrally with the ball screw nut 45 in the axial direction ZA. At this time, due to the recessed portion 34 and the grease 55 filled therein, a sliding friction of the bearing 50 with respect to the inner peripheral surface of the second housing portion 32 is reduced. This allows the bearing 50 and the ball screw nut 45 to move smoothly. When the bearing 50 and the ball screw nut 45 move slightly as such, the ball screw nut 45 smoothly rotates afterward along with driving of the motor (the drive source) 41.

According to the above embodiment, it is possible to yield the following effects. When the rack shaft 21 slightly moves in the axial direction ZA along with a rotation of the steering 2, the ball screw nut 45 and the double row angular contact ball bearing 50 integrally move relative to the rack shaft 21 against the elastic force of the metal spring 62. When the double row angular contact ball bearing 50 and the ball screw nut 45 are moved as such, the ball screw nut 45 rotates smoothly afterward via the motor 41 relative to the rack shaft 21, and eventually the rack shaft 21 moves smoothly in the axial direction ZA.

Further, when the metal spring 62 is provided between the double row angular contact ball bearing 50 and the housing 30 (the wall portions 31c, 32c), it is possible to reduce a reaction force Pa that the outer ring portion 51 receives from the housing 30 (the wall portions 31c, 32c) at the time when the double row angular contact ball bearing 50 moves. This makes it possible to form the outer ring portion 51 thinly, and eventually to configure the electric power steering system 10 in a compact manner in terms of a size in the radial direction ZB.

The raceway bottom thickness T in the outer ring portion 51 of the double row angular contact ball bearing 50 is set to 25% to 30% of the ball diameter Bd. Thus, even if the raceway bottom thickness T is set thinner than a general outer ring portion 51 in a conventional technique, it is possible to reduce the reaction force Pa that the outer ring portion 51 in the double row angular contact ball bearing 50 receives from the housing 30 (the wall portions 31c, 32c), as described above. This makes it possible to maintain durability, and to configure the double row angular contact ball bearing 50 in a compact manner in terms of a size in the radial direction ZB.

When the rate of spring of the metal spring 62 is adjusted, it is possible to adjust the reaction force Pa that the outer ring portion 51 receives from the housing 30 via the metal spring 62. More specifically, as the rate of spring is smaller, the reaction force Pa that the outer ring portion 51 receives becomes smaller.

The retaining portion 61a of the plate 61 supports the metal spring 62 from a direction opposed to the gravitational direction. This makes it possible to prevent the metal spring 62 from being displaced to the gravitational direction. In view of this, it is possible to further surely support the bearing 50 via the elastic forces of the metal springs 62 on both sides. This stabilizes the operation of the electric power steering system 10, and eventually operationability of the steering 2.

Further, it is possible to restrain the housing 30 made of aluminum from being abraded due to the metal spring 62 making contact with the housing 30. Further, it is also possible to restrain abnormal noise caused by the abrasion. As illustrated in FIG. 5, the retaining portion 61a is formed on an inner peripheral side of the metal spring 62 throughout a circumferential direction ZC of the metal spring 62. Accordingly, regardless of a positional relationship in the circumferential direction ZC between the plate 61 and the metal spring 62 after assembly, part of the retaining portion 61a supports the metal spring 62 from the direction opposed to the gravitational direction. Accordingly, it is possible to improve degrees of freedom of assembly in the circumferential direction ZC at the time when a component in which the metal spring 62 is fitted into the plate 61 is assembled between the bearing 50 and each of the wall portions 31c, 32e.

The double row angular contact ball bearing adopted as the bearing 50 can be configured such that the outer ring portion 51 is made thinner than that in a single row bearing or the like. This is because the number of balls 53 between the outer ring portion 51 and the inner ring portion 52 is large, so that a load to be added to the outer ring portion 51 can be distributed via the balls 53. According to the above configuration, when a coned disc spring is adopted as the metal spring 62, it is possible to press the side surface of the outer ring portion 51 of the bearing 50 by the coned disc spring over a whole circumference thereof. Accordingly, even in a case of the double row angular contact ball bearing including the thin outer ring portion 51, it is possible to stably restrain the bearing 50 elastically.

The recessed portion 34 is formed on a contact surface between the bearing 50 and the housing 30. The recessed portion 34 reduces a contact area between the bearing 50 and the housing 30. In view of this, as described above, it is possible to reduce a sliding friction of the bearing 50 with respect to the housing 30 at the time when the ball screw nut 45 and the bearing 50 move integrally.

When the recessed portion 34 is filled with the grease 55, it is possible to further reduce the sliding friction of the bearing 50 with respect to the housing 30. The double row angular contact ball bearing 50 is longer in the axial direction ZA than that of a single row bearing or the like. Accordingly, in the double row angular contact ball bearing 50, the contact area between the bearing 50 and the housing 30, eventually, the sliding friction become large naturally. However, according to the above configuration, it is possible to reduce the sliding friction of the bearing 50 with respect to the housing 30. As a result, even with the configuration that adopts the double row angular contact ball bearing, it is possible to smoothly move the double row angular contact ball bearing 50 in the axial direction ZA.

Since the recessed portion 34 is formed in the housing 30 made of aluminum, it is possible to easily form the recessed portion 34.

Note that the above embodiment is performable in the following embodiments in which the above embodiment is modified appropriately. In the above embodiment, the housing 30 is constituted by the first housing portion 31 and the second housing portion 32, but the housing 30 may be formed integrally.

In the above embodiment, the metal spring 62 is a coned disc spring, but may be a waved washer. Alternatively, the metal spring 62 may be an elastic member made of resin, such as rubber. Even in this case, displacement of the elastic member is restrained by the retaining portion 61a. In the above embodiment, the raceway bottom thickness T is set to 25% to 30% of the ball diameter Bd, but may be out of this range.

In the above embodiment, the housing 30 is formed of aluminum, but may be formed of iron.

In the above embodiment, the retaining portion 61a of the plate 61 is formed over a whole circumference of the abrasion prevention portion 61b, but the retaining portion 61a may be partially formed in the abrasion prevention portion 61b. In this case, the retaining portion 61a is formed in the plate 61 at least in that direction of the metal spring 62 which is opposed to the gravitational direction. Further, a plurality of retaining portions may be fondled at given angle intervals. According these configurations, it is possible to form the plate 61 from fewer materials.

In the above embodiment, the sectional shape of the plate 61 is an L shape, but the shape thereof is modifiable appropriately. For example, the retaining portion 61a may be provided at an outer peripheral side of the metal spring 62, not at the inner circumferential side thereof. Even in this case, the retaining portion is placed in the gravitational direction with respect to the metal spring 62 on a lower side in FIG. 2. As a result, it is possible to prevent a fall of the metal spring 62. Further, the retaining portion 61a may be formed at both of the inner circumferential side and the outer peripheral side of the metal spring 62.

In the above embodiment, the bearing 50 is a double row angular contact ball bearing, but the bearing 50 is not limited to this and may be a bearing of other types.

In the above embodiment, one recessed portion 34 is provided, but a plurality of recessed portions 34 may be provided along the axial direction ZA. In the above embodiment, the recessed portion 34 is filled with the grease 55, but the grease 55 may not to be filled therein. Even in this case, since the recessed portion 34 is formed in a recessed shape, it is possible to reduce the contact area between the bearing 50 and the second housing portion 32, and eventually to reduce the sliding friction of the bearing 50 with respect to the second housing portion 32.

In the above embodiment, the recessed portion 34 is formed in the housing 30, but may be formed in an outer peripheral surface of the bearing 50. Even in this case, it is possible to obtain an effect similar to the above embodiment. The following describes technical ideas that can be understood from the above embodiments, as well as effects.

The electric power steering system is characterized in that the elastic member is a waved washer. The electric power steering system is characterized in that the housing is made of aluminum, the plate is made of iron, and the elastic member is made of metal.

The electric power steering system is characterized in that the housing is made of aluminum, and the recessed portion is formed in the housing that makes plane contact with the bearing.

The electric power steering system is characterized in that the lubricant is grease. The electric power steering system is characterized in that the elastic retaining portion includes: a wall portion that is part of the housing and placed at either side of the bearing in the axial direction of the steered shaft so as to be distanced from the bearing; and an elastic body provided between the wall portion and the bearing.

What is claimed is:

1. An electric power steering system comprising:
    a steered shaft configured to move in an axial direction along with a rotation of a steering;
    a housing containing the steered shaft therein so that the steered shaft is movable in the axial direction;
    a ball screw nut engaged threadedly to the steered shaft via a plurality of balls and configured to move the steered shaft in the axial direction when the ball screw nut is rotationally driven via a drive source;
    a double row angular contact ball bearing including a toric outer ring portion having an outer peripheral surface making contact with an inner peripheral surface of the housing, a toric inner ring portion placed inside the outer ring portion and retaining the ball screw nut thereinside, and balls configured to roll between the outer ring portion and the inner ring portion and arranged in several lines along the axial direction, the double row angular contact ball bearing configured to support the ball screw nut rotatably relative to the housing;
    a pulley fixed to the ball screw nut beside the double row angular contact ball bearing, the pulley being driven by the drive source;
    a wall portion placed at either side of the double row angular contact ball bearing in the axial direction of the steered shaft, the wall portion being formed integrally with the housing;
    an elastic member provided between the wall portion and the outer ring portion and configured to retain the double row angular contact ball bearing to be elastically displaceable in the axial direction; and
    a plate that has an L-shape section that is formed by a retaining portion and an abrasion prevention portion, wherein:
        the abrasion prevention portion is provided between the elastic member and the wall portion and remains in contact with the wall portion when the elastic member is both compressed and stretched,
        the elastic member has an inner radial surface and an outer radial surface, the inner radial surface being supported by the plate and the outer radial surface not being supported by the plate, and
        a length of the retaining portion in the axial direction is set such that the retaining portion and the outer ring portion of the double row angular contact ball bearing do not overlap in the axial direction when the elastic member is stretched.

2. The electric power steering system according to claim 1, wherein:
    a ball retaining hole configured to retain the balls in a rollable manner is formed on an inner peripheral surface of the outer ring portion; and
    a raceway bottom thicknesses from a vertex of the ball retaining hole in the outer ring portion to an outer surface of the outer ring portion is set to 25% to 30% of a ball diameter.

3. The electric power steering system according to claim 1, wherein:
    the elastic member is formed in a toric shape, and the retaining portion is formed at an inner circumferential side of the elastic member over a whole circumference of the elastic member.

4. The electric power steering system according to claim 1, wherein:
    the elastic member is a coned disc spring configured to press a whole circumference of a side surface of the outer ring portion of the double row angular contact ball bearing and a whole circumference of the plate in a direction to be separated from each other.

5. The electric power steering system according to claim 1, further comprising:
    a recessed portion formed on a surface where the outer peripheral surface of the double row angular contact ball bearing makes contact with the inner peripheral surface of the housing.

6. The electric power steering system according to claim 5, wherein:
    the recessed portion is filled with lubricant.

7. The electric power steering system according to claim 5, wherein:

the recessed portion is formed on the inner peripheral surface of the housing.

8. The electric power steering system according to claim 1, wherein:
the elastic element is made of metal, the plate is made of iron and the housing is made of aluminum.

* * * * *